Sept. 30, 1969 JAMES E. WEBB 3,470,318

ADMINISTRATOR OF THE NATIONAL AERONAUTICS AND SPACE ADMINISTRATION

SOLID STATE TELEVISION CAMERA SYSTEM

Filed May 11, 1966 6 Sheets-Sheet 1

MARVIN A SCHUSTER
JAMES C. BRODERICK
CARL T. HUGGINS
WILLIAM F. LIST
GENE STRULL
DAVID E. CALLAHAN
INVENTORS

BY

ATTORNEYS

MARVIN A. SCHUSTER,
JAMES C. BRODERICK
CARL T. HUGGINS
WILLIAM F. LIST
GENE STRULL
DAVID E. CALLAHAN
*INVENTORS*

BY [signatures]
*ATTORNEYS*

Sept. 30, 1969 JAMES E. WEBB 3,470,318

ADMINISTRATOR OF THE NATIONAL AERONAUTICS AND SPACE ADMINISTRATION

SOLID STATE TELEVISION CAMERA SYSTEM

Filed May 11, 1966 6 Sheets-Sheet :

MARVIN A. SCHUSTER
JAMES C BRODERICK
CARL T. HUGGINS
WILLIAM F LIST
GENE STRULL
DAVID E. CALLAHAN

INVENTORS

BY [signature]

ATTORNEYS

Sept. 30, 1969 JAMES E. WEBB 3,470,318
ADMINISTRATOR OF THE NATIONAL AERONAUTICS
AND SPACE ADMINISTRATION
SOLID STATE TELEVISION CAMERA SYSTEM
Filed May 11, 1966 6 Sheets-Sheet 4

MARVIN A. SCHUSTER
JAMES C. BRODERICK
CARL T. HUGGINS
WILLIAM F. LIST
GENE STRULL
DAVID E. CALLAHAN,
*INVENTORS*

BY

*ATTORNEYS*

MARVIN A. SCHUSTER,
JAMES C. BRODERICK
CARL T. HUGGINS
WILLIAM F. LIST
GENE STRULL
DAVID E. CALLAHAN
INVENTORS
BY
ATTORNEYS

Sept. 30, 1969 JAMES E. WEBB 3,470,318

ADMINISTRATOR OF THE NATIONAL AERONAUTICS AND SPACE ADMINISTRATION

SOLID STATE TELEVISION CAMERA SYSTEM

Filed May 11, 1966 6 Sheets-Sheet 6

MARVIN A. SCHUSTER
JAMES C. BRODERICK
CARL T. HUGGINS
WILLIAM F. LIST
GENE STRULL
DAVID E. CALLAHAN

*INVENTORS*

BY

*ATTORNEYS*

3,470,318

SOLID STATE TELEVISION CAMERA SYSTEM

James E. Webb, Administrator of the National Aeronautics and Space Administration, with respect to an invention of Marvin A. Schuster, Baltimore, and James C. Broderick, Ellicott City, Md., Carl T. Huggins, Huntsville, Ala., and William F. List, Lenthicum, Gene Strull, Pikesville, and David E. Callahan, Baltimore, Md.

Filed May 11, 1966, Ser. No. 550,088
Int. Cl. H04n 3/16
U.S. Cl. 178—7.1 16 Claims

ABSTRACT OF THE DISCLOSURE

A solid state television camera system consisting of a monolithic semiconductor mosaic sensor and a molecular digital readout system. The readout circuit includes a timing and switching circuit for sequentially reading the output of each of the transistors in the mosaic and an output circuit for visually displaying the output of the mosaic sensor. The sensor is a M x N matrix of phototransistors interconnected by M common collector regions (rows) and N rows of connected emitters, so that any combination of one collector row and one emitter row will provide unique access to one phototransistor.

The invention described herein was made in the performance of work under a NASA contract and is subject to the provisions of Section 305 of the National Aeronautics and Space Act of 1958. Public Law 85-568 (72 stat. 435; 42 USC 2457).

This invention relates to a television system and more particularly to a miniaturized solid state television camera system.

The usual device for converting a pictorial scene or image into electrical signals is the present day camera tube, which may be, for example, an iconoscope, an orthicon, a vidicon tube, etc. The camera tube is a scanning device, and it receives a visual image and transforms the image into an electrical signal. The camera tube has an evacuated glass envelope and is therefore quite fragile. The tube has a photosensitive surface and it contains an electron gun, which is quite susceptible to vibration, and a suitable focusing means for the electron beam emanating from the gun.

The photosensitive surface of the camera tube is a mosaic structure composed of a multiplicity of photo-elements. The image to be stored in the camera tube and transformed into electrical signals is focused onto the mosaic photosensitive surface, and its light and shade values cause a plurality of capacitive elements associated with respective ones of the photo-elements to assure corresponding electric charges.

As the mosaic of the camera tube is scanned by an electric beam, the resulting current flow through the capacitive elements, and through a common output impedance, represents in electrical form the light and shade values of the stored image. The resulting electrical output signal appearing across the common impedance is representative therefore, of the image stored in the camera tube.

The prior art camera tube as described above is a somewhat bulky and cumbersome piece of equipment, it is fragile, it is sensitive to vibration of relatively low level, and it is relatively difficult and expensive to construct. In addition, the camera tube is not readily adaptable to miniaturization or to reductions in power consumption. However, requirements have recently developed in aerospace systems for improved television camera systems which are less fragile and have considerably less size and weight and lower power consumption than is possible with the use of camera tubes and which will still retain the high reliability, and stability of the presently-known devices.

Therefore, it is broadly an object of the invention to provide an improved television camera system which is more rugged and more portable than is possible with present television systems.

It is a further object of the invention to provide an improved television camera system which is more reliable, more rugged, smaller, lighter in weight, lower in voltage and power consumption, and with a more flexible form factor, while not sacrificing the reliability or stability of the conventional television camera systems.

It is a still further object of the invention to provide a miniaturized television camera system which is more rugged than conventional television camera systems and which completely eliminates the camera tube which is utilized in such systems.

These and other objects are accomplished in the present invention in which there is provided a solid state television camera system consisting of a monolithic semiconductor mosaic sensor and a molecular digital readout system. The readout circuit includes a switching circuit for sequentially reading the output of each of the transistors in the mosaic.

The invention will be more fully understood by the following detailed description when taken together with the accompanying drawings in which.

Figure 1:
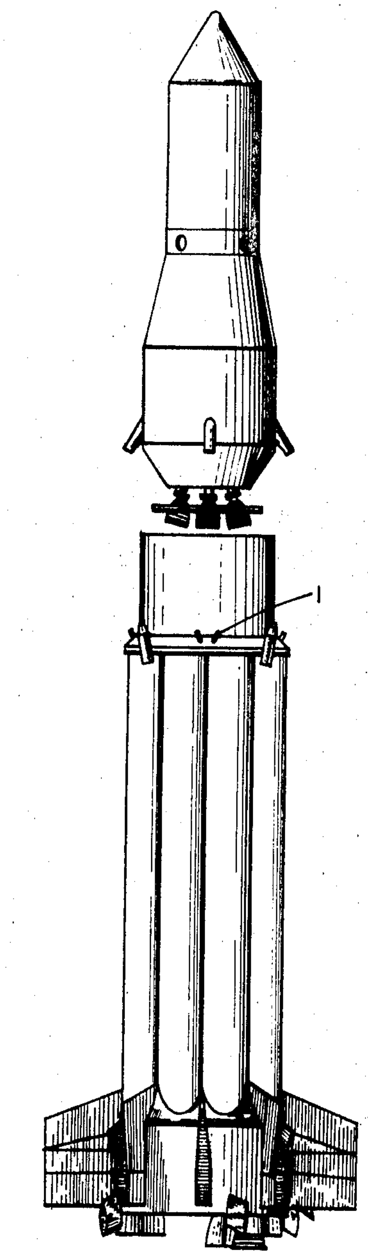
FIGURE 1 is a side exploded view of a complete launching vehicle and space craft showing the optical parts of the television camera system in a position to sense the separation of two adjacent stages.
Figure 2:
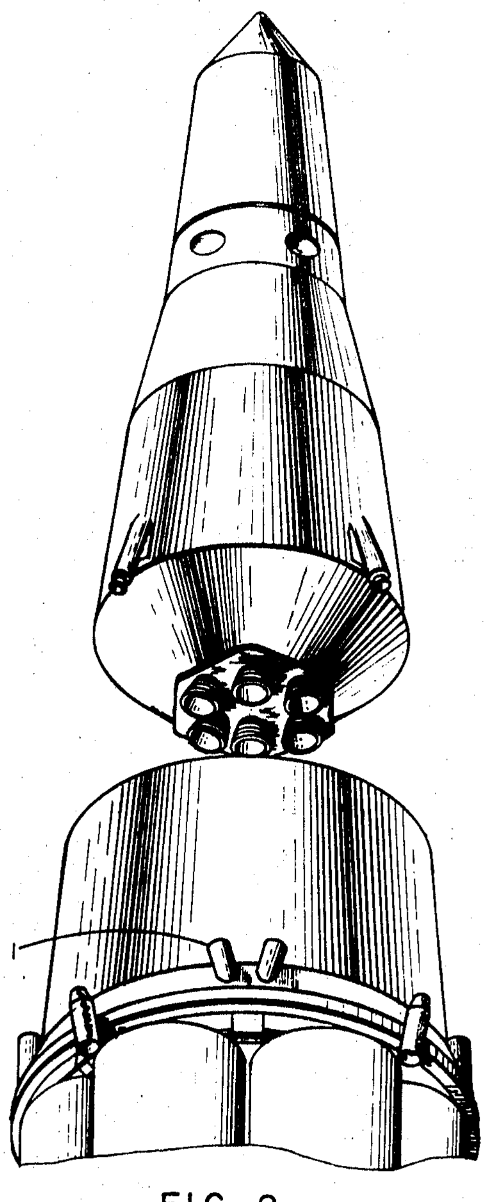
FIGURE 2 is a perspective exploded view of the present invention in its sensing position aboard the launching vehicle in flight.

Referring now to the drawings and particularly to FIGURES 1 and 2, there is shown an illustrative use of the present invention. The solid state television camera system of the present invention is mounted on the booster units of the rocket in such a manner that the camera may sense the separation of each booster unit from the adjacent portion of the rocket. The camera lenses, which are conventional 16 mm. movie camera lenses, are contained in the lense cases 1. Lens cases 1 for two adjacent cameras are shown in FIGURES 1 and 2. Thus, personnel at a ground monitor station may visually observe the separation of a booster from its rocket during the rocket flight.

Figure 3:
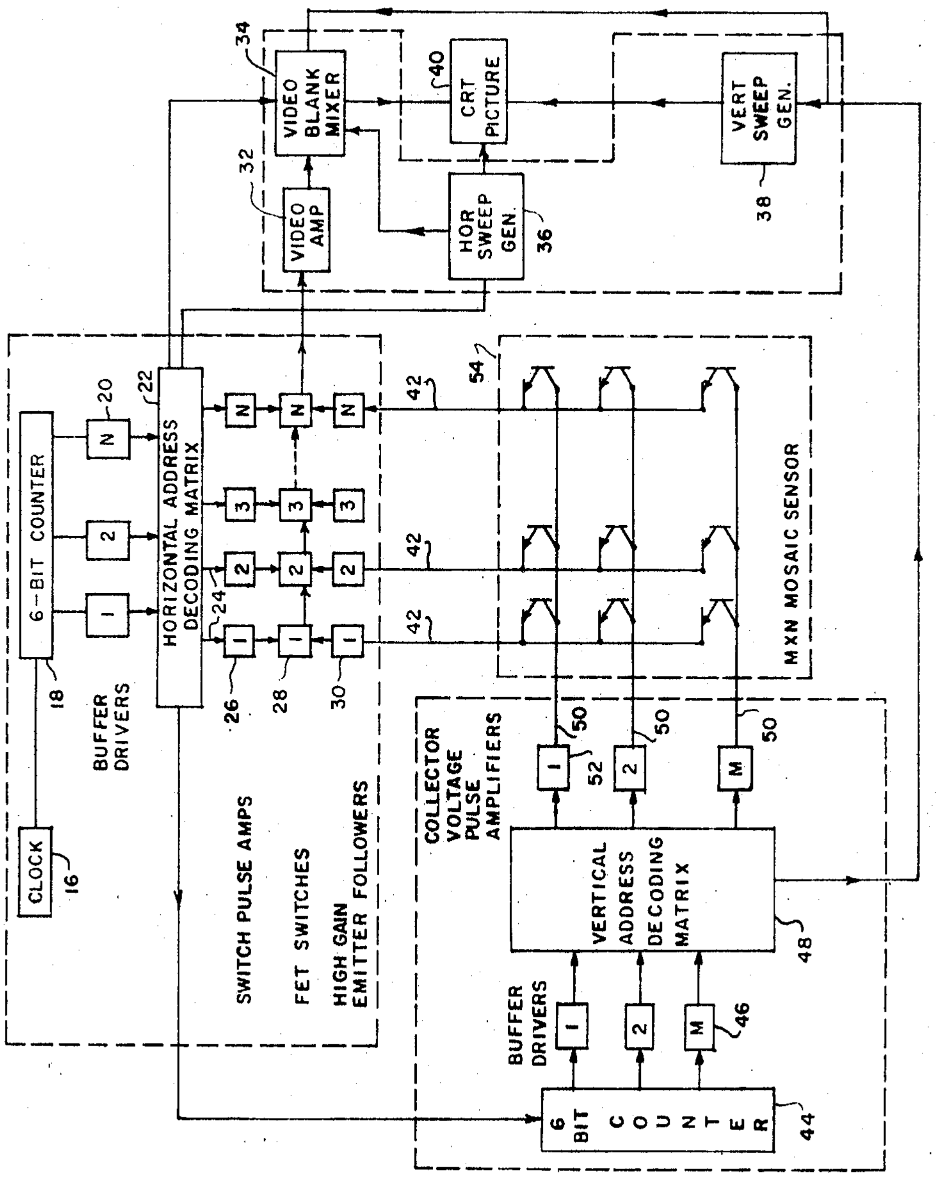
FIGURE 3 is a block diagram of an illustrative embodiment of the invention.

Referring next to FIGURE 3 of the drawings, there is shown a block diagram of an illustrative embodiment of the invention using one type of semiconductor sensor, the phototransistor. The illustrative embodiment of the invention includes a 50 by 50 phototransistor element mosaic shown in box 54 and its associated readout circuits shown above and on both sides of box 54. The readout circuits include a video pre-amplifier, commutating switches, and logic circuitry. A more complete discussion of the television camera system of FIGURE 3 will be found later in the disclosure when a complete cycle of operation of the device is discussed.

Figure 4:
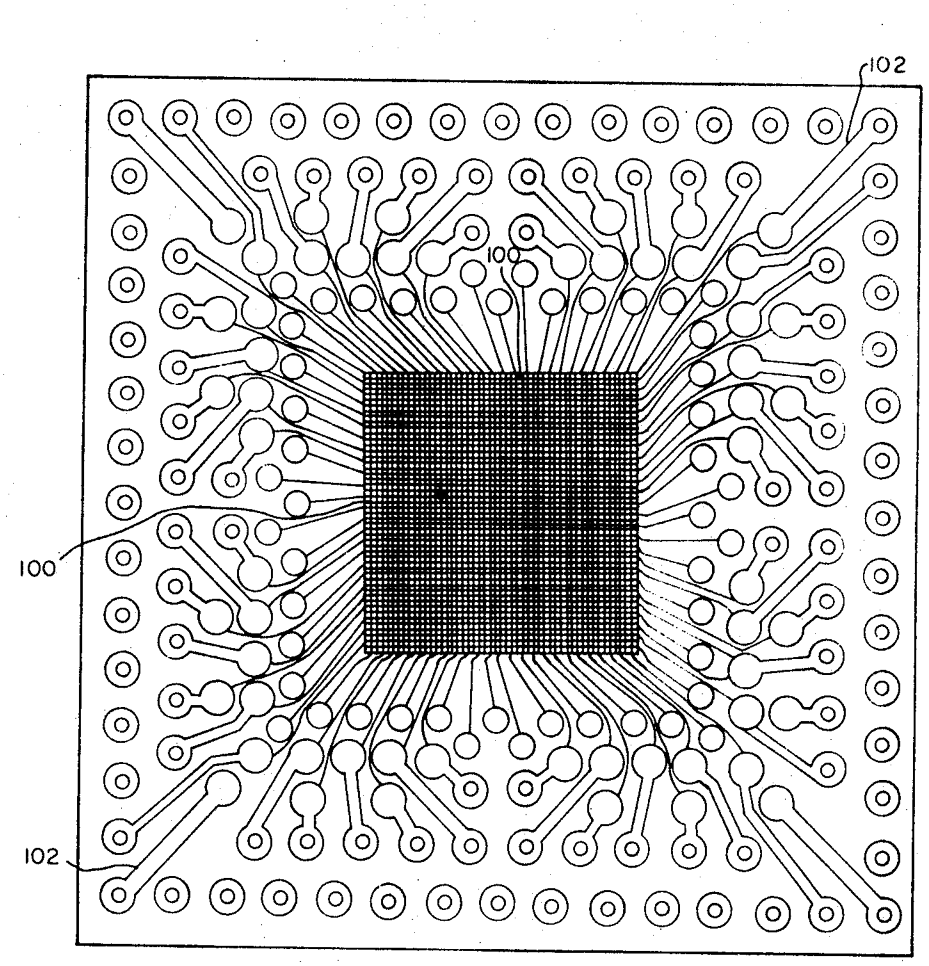
FIGURE 4 is a plan view of the mosaic sensor with XY interconnections and terminals for use in the imaging system.
Figure 5:
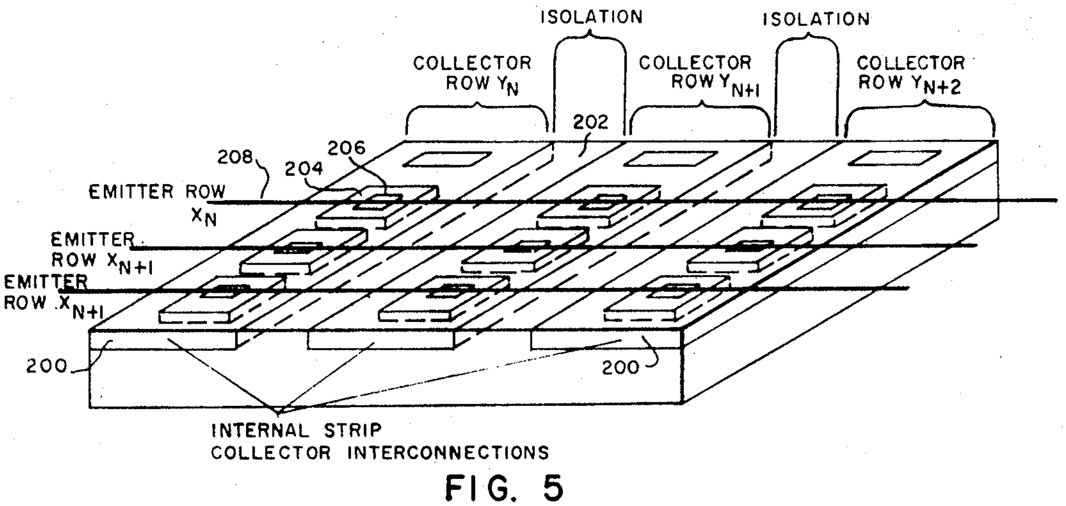
FIGURE 5 is a perspective, diagrammatic view of the mosaic sensor and the XY interconnections of the individual phototransistor elements.

The sensor mosaic, which may be seen best in FIGURES 4 and 5, is a matrix of 50 by 50 NPN phototransistors on 10 mil centers. The phototransistor elements have a square geometry with discrete emitter and base sections but with collector regions which are common to a row of 50 elements. No electrical access is provided to the individual phototransistor base regions. The emitters are interconnected with evaporated aluminum strips in 50 isolated columns. A more detailed discussion of FIGURE 4 will be deferred until the discussion of the mosaic sensor.

Readout is accomplished by applying a voltage to a 50 element collector strip and sequentially commutating the rows of emitter elements. In this way it is possible to sequentially read one element at a time while cutoff is maintained for all other elements.

To enhance camera sensitivity, the emitter element readout circuitry includes 50 emitter follower amplifiers. These followers provide a high input impedance for each phototransistor element and a low output impedance for the switching circuit, which utilizes field effect transistors, selected for minimum offset voltage and high impedance gating characteristics.

Flip-flop binary logic is used to obtain the sequence of pulses necessary for multiplexing the mosaic. The logic provides the timing for pulsing the emitter readout switches, the timing for the application of voltage pulses to the collector rows of phototransistors, and the timing for synchronizing the horizontal and vertical sweep generators for the monitor. With this logic, fan out requirements are nominal and reliable operation is assured because of the sequential nature of the set-reset operation in a string of flip-flops.

THE MOSAIC SENSOR

A monolithic mosaic of phototransistors, such as is used in the present invention, can be employed for various imaging applications. Each phototransistor element of the M x N mosaic is sequentially pulsed for readout. To accomplish this, electrical contact must simultaneously be made to two regions, emitter and collector, of each element. All emitters in a row X must be interconnected and all collectors in a column Y must be interconnected. The interconnections X1, X2, must be isolated from each other; the interconnections Y1, Y2, must be likewise isolated from each other. In addition, all X interconnections must be isolated from all Y interconnections. Thus, when an emitter row X and a collector column Y are pulsed, only element XY will be read out.

An example of the sensor mosaic will be described in terms of an NPN phototransistor mosaic, it being understood that with the substitution of n-type material for p-type and vice versa a pnp mosaic can also be used. In addition, other semiconductor mosaics such as photodiodes, of either polarity, may also be used.

It should further be understood that the semiconductive material employed in the preparation of the device of this invention may be silicon, germanium, silicon carbide, or a stoichiometric compound comprised of elements from Group III of the Periodic Table, for example, gallium, aluminum, and indium, and elements from Group V of the Periodic Table, for example, arsenic, phosphorus, and antimony. Examples of suitable III–V stoichiometric compounds include gallium arsenide, gallium antimonide, indium arsenide, and indium antimonide.

The mosaic sensor of the present invention is an M(50) x N(50) element array of light sensitive NPN phototransistors formed by both epitaxy and diffusion on a silicon wafer monolith. The topography of the 50 x 50 mosaic 100 is shown in FIGURE 4, including the terminal strips 102, to which the row and column terminations of the mosaic sensor are connected. These strips may be seen in the area surrounding the mosaic. Although the method of making the multi-transistor monolith is not a part of the disclosure of this invention, a brief discussion of the physical make-up of the monolith and its interior connections is deemed proper at this point. Strip collector regions are created in an epitaxial n-type doped layer grown on a p-type silicon substrate by a p-type isolation diffusion. Discrete base and emitter regions are diffused into each strip collector to produce the desired number of transistor structures. The emitters are interconnected at right angles to the collector strips through the use of a vapor deposited metallized interconnection pattern. The photo-current through any single element can be measured by connecting a voltage to a particular collector strip and monitoring the current through an emitter row. Bonded wire connections at the edge of the mosaic to each of the M collector rows and to each of N metallized interconnection strips joining the emitters which lie in columns serve to tie the mosaic sensor to its readout system, through the terminal strips mentioned above.

The internal strip interconnections for the X–Y readout of the mosaic sensor may best be seen in FIGURE 5. Internal strip collector interconnections 200 form a common collector region for all phototransistors in each collector row. Adjacent rows of collector strips are completely insulated by diffused isolation areas 202. Spaced along each of the M(50) collector rows are N(50) discrete base regions 204 and emitter regions 206, thus forming the M x N matrix that is the image sensor. All emitters are connected together by metallized emitter interconnection strips 208 to form the X (emitter) rows.

There are several advantages to this system of interconnections for X–Y readout as practiced in the instant invention. Interconnections for the collector rows are interior to the structure, being defined by diffused and epitaxial regions. The probability of collector-isolation shorts, which might occur if surface interconnections were employed, is completely eliminated. By diffusing a collector strip that is common to all elements in a row $Y_N$, all collectors in this row of elements are internally interconnected. The isolation areas in the new structure are those between collector columns, $Y_N$ and $Y_N+1$. The major advantage of this scheme is its simplicity. Any ohmic contact, short circuit, open circuit, etc., problems associated with surface interconnections are totally eliminated for all the collector interconnections. In addition, part of the diffused isolation regions are eliminated, so that fabrication problems, problems of junction characteristics, space consumption problems, etc., associated with collector surface interconnections are likewise eliminated. As a result mosaics are fabricated with high yields and greater reliability.

At this point, comment should be made on some of the theoretical considerations involved in the mosaic sensor.

The phototransistor steady state mode of operation is much like that on an ordinary transistor except that the base drive is provided by optical rather than electrical means. The phototransistor operates with a low collector bias voltage when a base drive is produced as a result of photon absorption in the base region. Optical-electrical conversion occurs and the photons generate electron-hole pairs. If the carrier pairs are liberated within a diffusion length of the depletion region around the collector junction, the electrons will diffuse to this depletion region and be swept across the junction where they account for a small component of the photocurrent. Similarly, the holes of the same carrier pairs which are created within the base by this process act as the majority current in precisely the same manner as that provided through the base contact of an ordinary transistor. They induce injection of minority carriers into the base by forward biasing the emitter. This accounts for the substantial transistor photocurrent. The actual optical-electrical conversion process is related to a diode phenomenon; namely, that of the collector-base diode. The transistor structure, however, serves to amplify the photoeffect.

The quantum conversion efficiency of the diode of a sensor element, $\gamma$, is given by the following ratio:

$$=\frac{N}{\Phi}$$

where:

N=number of photogenerated electrons/sec. which cross the base-collector junction, and $\Phi$=number of photons/sec. incident on the sensor surface This expression is concerned with the actual quantum conversion or diode photocurrent and does not represent the transistor photocurrent. The photon-electron conversion efficiency in silicon is approximately unity for photons in the visible and near infrared regions of the spectrum. There are, however, several factors which cause losses in the system so that $N<\Phi$ and $\gamma<1$. The following factors contribute to the degradation of conversion efficiency: some fraction, *r*, of the incident photons are reflected at the surface, and, hence, will not be absorbed within the sensor and cannot contribute to the conversion process. In addition, if electro-optical conversion occurs near the surface or if the photo-generated carriers diffuse to this region, a fraction, *s*, of them will be annihilated due to surface recombination. Likewise, a portion, *b*, of the carrier pairs will be neutralized by bulk recombination. Considering these losses, the quantum conversion efficiency can be expressed as $$\gamma=1-r-s-b$$

In order to minimize the effects of these detracting mechanisms, the following measures are employed: Surface photon reflection is reduced by the use of an $SiO_2$ layer as an anti-reflection coating. This layer particularly enhances the transmission of photons whose wavelength is four times its thickness. Surface recombination is minimized by employing as high an impurity concentration gradient at the surface as is practical in a diffused structure. This corresponds to a high field in that region which serves to sweep electrons away from the surface and into the bulk. The effects of bulk recombination are reduced by techniques such as the use of a relatively high resistivity in the base regions in order to maintain high minority carrier lifetime (although considerations of base spreading resistance limit this value), a shallow collector junction so that even those carriers which are created near the surface will be able to diffuse to the depletion layer about the base-collector junction, and a deep epitaxial collector layer of uniformly light doping to permit carriers which are created in this region to also cross the base-collector junction before recombination occurs. Holes which are swept into the base from the collector have the same effect as electrons which cross into the collector from the base (since the latter leave holes behind), namely, to forward bias the emitter. The electrons which remain in the collector as a result of photon absorption are majority carriers and leave this region at the collector contact. The base resistivity is selected as a compromise between a high value so that electrons will have a sufficiently high lifetime to reach the collector junction and a low value so that the holes remaining in the base will have the desired biasing effect on the emitter without this effect being diminished by an excessively high base spreading resistance.

Figure 6:
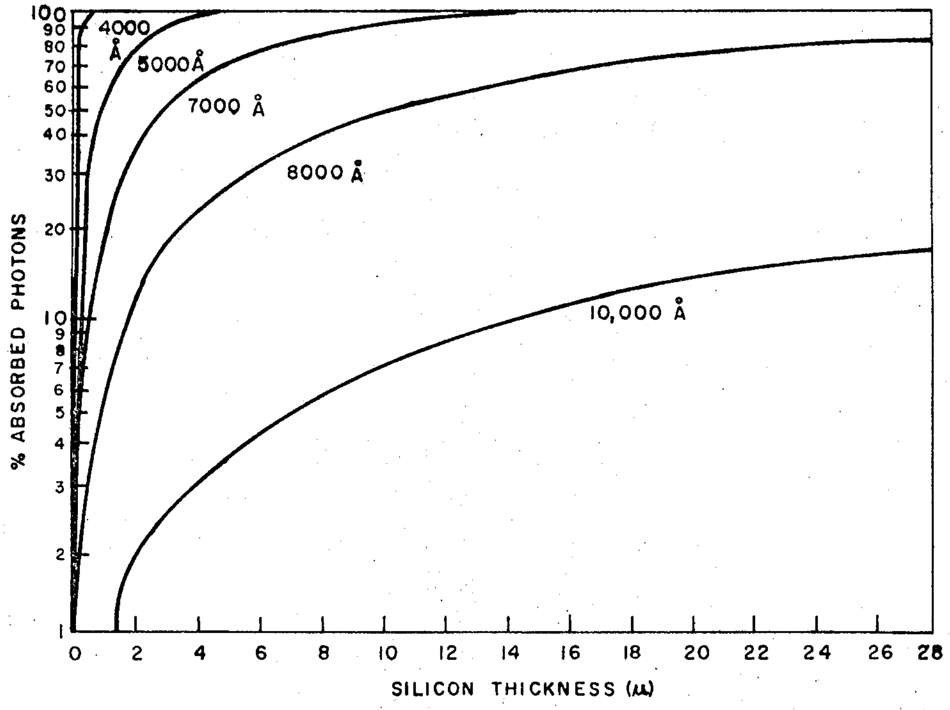
FIGURE 6 is a graph showing absorption of visible and near infrared radiation as a function of depth in silicon.

Photon absorption and hole-electron pair generation should ideally occur within a diffusion length of the depletion layer about the base-collector junction. However, the junction depth must be a compromise when a broad spectrum (0.4 to 1.1$\mu$) of radiation is to be imaged. The absorption characteristics of silicon are shown in FIG. 6, where the percentage of absorbed incident photons, $I/I_0$, of a given wavelength is plotted as a function of junction depth. If the junction is too shallow, the longer wavelength photons are absorbed too deep in the wafer to be within a diffusion length of the depletion layer about the active junction. Likewise, the photons of shorter wavelength are absorbed too near the surface to be detected if the junction is too deep.

These are some of the major sensor element design considerations relative to optimizing the quantum conversion efficiency and thereby producing a maximum junction photocurrent and its associated transistor current. The transistor photocurrent exceeds the corresponding junction value by a factor of the transistor gain. The thermally generated dark currents are, of course, superimposed on the signals. Transistor gain is designed to be moderately high so that very low level light inputs can be read out by the imaging system.

Figure 7:
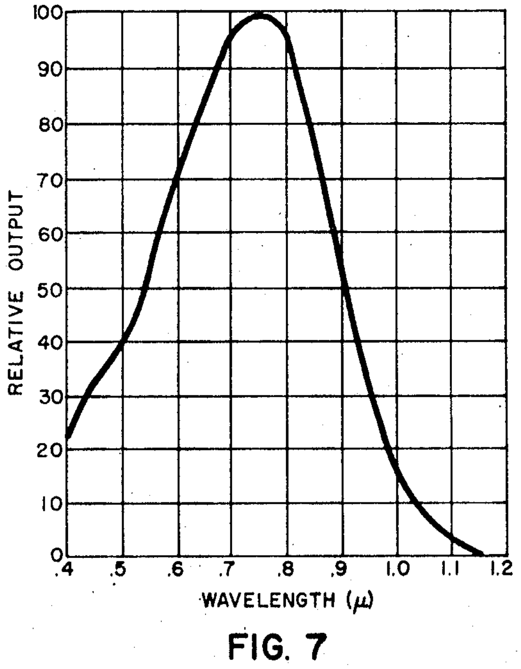
FIGURE 7 is a graph showing the spectral response of a typical silicon phototransistor element of the mosaic sensor.

Light detection by a silicon photosensor is subject to these considerations, among others. The generation of electron-hole pairs by incident illumination is wavelength dependent. For wavelengths longer than about 1.1 micron, no carriers are generated in the silicon because at these wavelengths the silicon is transparent. This is shown in the spectral response of silicon in FIGURE 7. Shorter wavelengths generate carriers but penetration of the bulk is still a function of wavelength. The photosensitive elements have a continuous unsaturated output response over 2 to 3 decades of light levels and a characteristic function whose exponent (gamma) is greater than one. Among the 2500 elements on a photosensor wafer, approximately 75% of them have a response within a 2:1 range at a given light level while 85% of them have a response within a 3:1 range.

The above description applies to the steady state operation of elements in the sensor mosaic. In the camera system, however, each element is sequentially interrogated or read out once each frame time so that the total on-time of the element is very brief. Hence the element is read out largely in a transient mode of operation. A description of the transient mode of phototransistor operation follows:

Generally, from a first approximation, the transient response of a periodically pulsed silicon phototransistor can be explained by considering it to be equivalent to an RC integrator in which the RC product is a function of ambient light level. In series is a commutating switch diode which isolates the integrator from the external circuitry between read pulses but permits a charging pulse to be introduced during read periods. The amount of charge replaced during a read pulse is a measure of the total number of photons incident upon the transistor in the period between pulses over a wide range of light levels.

Through a series of experiments it was concluded that the pulsed phototransistor at low light levels can be considered to consist of an electrical charge storage element, the base-collector structure and a commutating switch, the base-emitter structure. During a read pulse, current flows through the transistor charging the base emitter structure to a particular level through the forward biased base-emiter junction. At the end of this pulse, the base collector capacitance, looking from the base, is reverse biased, and the base emitter capacitance is forward biased, with the collector and base tied together through the external pulser impedance. Since the resulting two potentials act to cause a current flow through the external circuit, a portion of the charge stored on the collector base structure, which is usually the larger capacitance, is consumed in discharging the base emitter structure and back-biasing the junction. The remaining charge stored on the base-collector structure is discharged through either leakage across the base emitter junction and the external circuit, leakage across the collector base junction, or photo current due to incident light. Dependent upon the ambient light level and the time between pulses, varying amounts of charge leak off. Thus, over a wide range of intensity-time products, the device exhibits the characteristics of a light integrator. For very low light levels, relatively long integration periods (up to 1 to 2 seconds) can be used for high quality silicon transistors. At higher light levels, much shorter integration periods must be employed if saturation (total discharge) is to be avoided.

During the read cycle, the amount of charge which has decayed during the integration period is replaced through the base emitter diode. Indications are that, at the very low current levels normally encountered, the forward impedance of this diode is highly variable and acts together with the external load resistance as an attenuator. Therefore, the voltage which appears across the external load resistor at the peak of the discharge transient (which would be expected to be approximately equal to the supply voltage less a diode drop) is considerably lower than this.

The model as described implies that the transistor geometry would be of significant importance, with transistors with higher base-collector capacitances to base-emitter capacitance ratios having a wider integration range. This has not been quantitatively established. However, preliminary tests with five structures with equal collector geometries but various base and emitter geometries do yield noticeably different characteristics.

The effect of transistor beta on the model has not been clearly defined; however, the output current is a function of beta. The model described also implies that increasing the external circuit impedance would both change the charging time constant and limit the charging current, resulting in a more nearly constant charging current. This effect is in fact noted with external circuit impedances of approximately 2 megohms yielding an almost flat response characteristic for a 16 millisec. period with a particular transistor geometry.

As the light level is increased for any given external circuit configuration, the transient response shifts from a pulse with a high peak decaying toward a lower steady state value, to an essentially flat response at a value equal to the peak amplitude of the transient pulse, and hence to a region in which the initial value equals the transient peak level followed by a rising response which terminates at a level equal to the supply voltage less the saturation voltage of the transistor. The time constant of this rising characteristic appears to correspond to the time constant of an RC circuit made up of the shunt capacitance across the load impedance and the equivalent resistance of the phototransistors. The transfer point appears to occur at the level at which the steady state response of the base collector yields an effective impedance approximately equal to that of the series connected base-emitter structure and external load impedance.

THE READOUT SYSTEM

The function of the readout system is to generate the necessary timing, gating, and blanking pulses and to control these individual signals so as to transfer the electrical content of the mosaic to the output circuit.

Before discussing the sequence of operation of the television camera system, it is considered necessary at this point in the disclosure to discuss each of the major components of the readout, namely, the video pre-amplifier, the commutating switches, and the logic circuitry.

VIDEO PRE-AMPLIFIER

For the 50 x 50 element mosaic readout, circuitry is necessary which provides high gain, wide bandwidth, and low noise. Like a vidicon camera tube, a phototransistor element is a current generator and therefore requires a current amplifier, the gain required being substantial (depending on scene ambients and subject light levels) over a bandwith which allows element signal rise-fall times of less than 1 microsecond. Since noise levels are determined by unwanted transients in the switch circuits, sensor element noise is not the limiting factor. In order to get as large a signal to noise ratio as possible, it is therefore necessary to use the amplifier before the switch.

Figure 8:
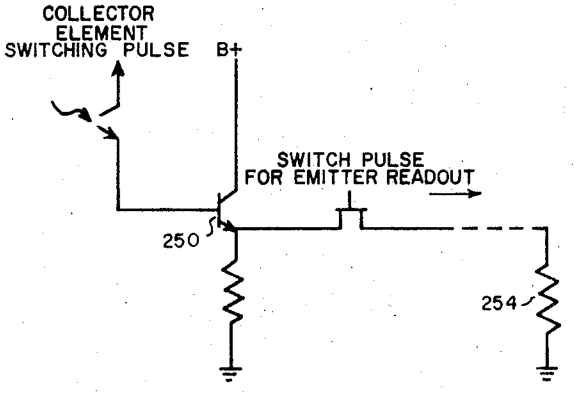
FIGURE 8 shows an individual phototransistor element readout with photo element, emitter follower amplifier, and field effect transistor switch.

The circuit shown in FIGURE 8 uses an emitter follower 250 with a current gain of 300 at 1 microamp and an input impedance of three hundred kilohms. This load impedance puts operation of the mosaic elements in the center of the most linear part of their operating characteristic at low and medium light levels and produces system sensitivities in the vicinity of vidicon performance. Switch circuit impedance 254 is about 1 kilohm which reduces switch circuit transients to a tolerable level. In the instant invention, these amplifiers were custom constructed from general purpose molecular blocks for small size and high reliability. However, they could be constructed from conventional components. These amplifiers must have adequate bandwidth to preserve rise-fall times of 1 microsecond for the camera described herein.

The emitter follower amplifier is a very necessary and important part of the readout commutating circuitry for the following reasons:

(1) It DC couples the mosaic sensor to the switch and the common output circuit and therefore preserves picture brightness (no DC restoration is required). DC coupling also eliminates sag due to coupling capacities.

(2) The circuit is easily molecularized.

(3) It has high input impedance to aid in producing high mosaic light sensitivity.

(4) It has low output impedance to reduce switch transients and switch noise. With this circuit, the impedance may be made so small that switching speeds required to readout mosaics of much larger than 50 x 50 elements can be readily obtained.

THE COMMUTATING SWITCHES

The sampling switches must be compatible with the low level and high speed signals involved and should be compatible with fabrication as an integrated semiconductor network. The signal levels lie in the range of 10 nanoamps to 10 microamps. While many types of switches could be used, field effect junction transistors (FET's) are close to being the ideal switch for this requirement and are employed in the 50 x 50 camera. Their advantages include excellent isolation between gate and source-drain circuits, no offset voltage, low noise level, and they require switching pulses of only one polarity. Other advantages can also be listed:

(1) FET's provide high input gate impedance foı switch pulse isolation in floating series switches.

(2) Because of this high input impedance, low gating pulse energy is required.

(3) When the FET switch is on, there is no pedestal voltage because of a necessary "on" bias. (However there is still a small flow of leakage current.)

(4) The "on" resistance of available FET's is now only about 200 ohms. This compares quite favorably to the saturation resistance of conventional small signal bipolar transistors.

(5) FET commutators are simple to fabricate and are easily integrated.

(6) In general, switch pulse amplitude is not critical above a minimum value.

(7) Gain-bandwidth of presently available FET's is of the order of 5 megacycles so that gating time is small.

(8) Scale errors are small because the FET switch is essentially linear over a range of about 3 decades.

(9) Noise characteristics of a FET are smaller than that of an equivalent bipolar transistor.

(10) The off resistance is typically tens of megohms.

(11) Since there is no offset voltage, there is no offset temperature effect.

The FET high input impedance makes a direct nonfloating drive feasible. Since NPN logic was used, pulse level shifting is unnecessary when using p channel FET's. Selected FET's were used with transconductances of greater than 10,000 micromhos, "on" resistance of 100 ohms and pinch-off voltages of 5 volts. The commutated signal voltages were positive. The signal handling capability of the switches extended from $10^{-3}$ volts to 1 volt.

THE LOGIC CIRCUITRY

Figure 9:
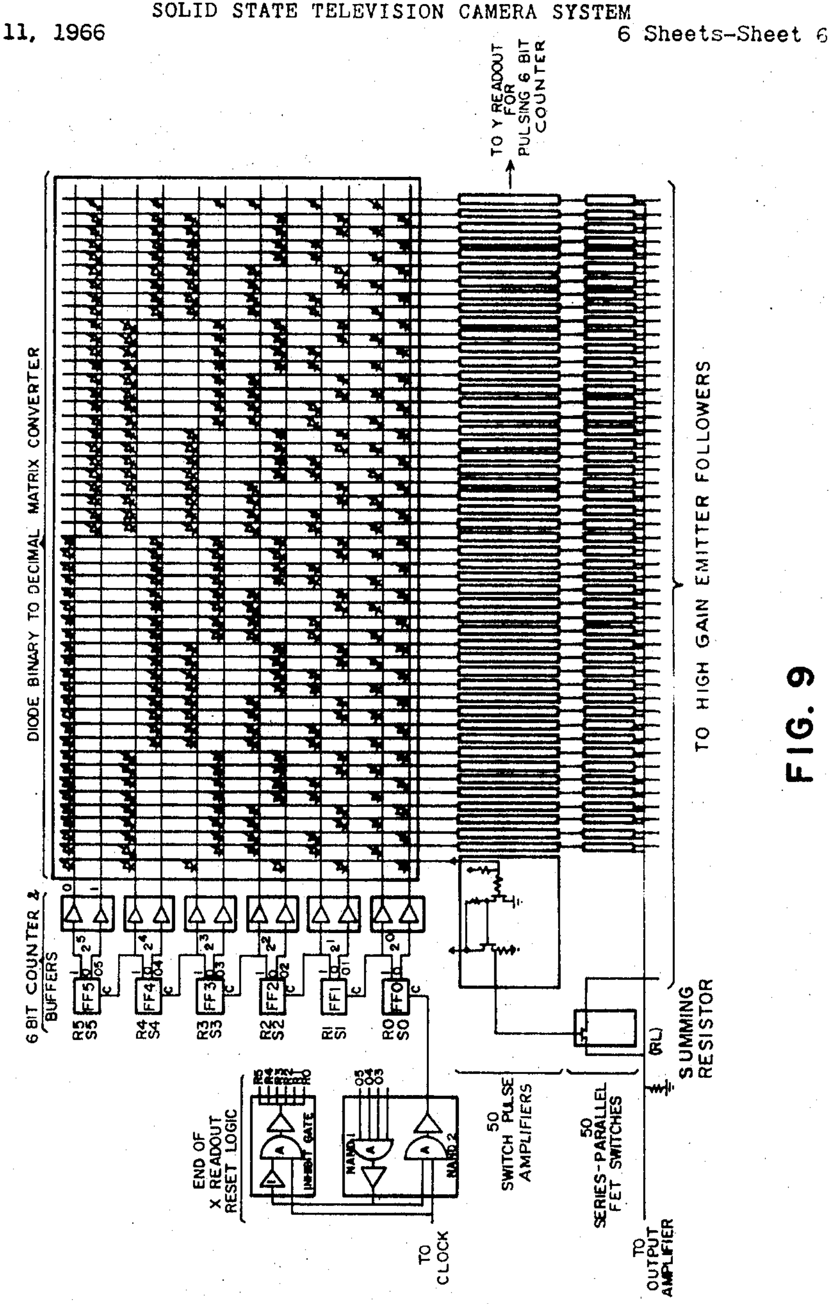
FIGURE 9 is a circuit diagram of the logic circuit for readout including 50 by 50 flip-flop counter, converter, and mosaic emitter switches.

The timing and pulse generating circuitry required for commutating the horizontal (X-dimension) sampling switches that synchronously read out the photoelements in the mosaic is shown in FIGURE 9. The sampling switches multiplex 2500 mosaic analog signals onto one output resistance at a 60 frame per second rate. Since there are 50 discrete elements on a line, the dwell time per element is about 6.6 microseconds and the clock frequency is 150 kilocycles. For the line switching, the dwell time is 50 elements$\times$6.6 microseconds or 330 microseconds. The clock frequency for this sweep, which was synchronized with the element sweep, was 3 kilocycles.

Many types of logic can be used to generate the required switch pulses including ring counters, shift registers, and flip-flop binary logic. For the 50 x 50 camera, NPN flip-flop binary logic was selected.

The required timing for the series of 50 pulses to drive the 50 element commutator for both X readout and Y readout of the mosaic sensor is obtained from the 6 bit flip-flop counter. Since only 50 of the available 64 sequential outputs of the register were used, a carry-over function or reset logic provision was necessary at the termination of readout of each line and row of mosaic sensor elements. This eliminates readout dead time. A diode matrix converter is used for translating each state of the 6 bit flip-flop counter into a pulse on one of 50 separate lines. Amplifiers are needed at the output of the converter to provide the correct amplitude and phase to drive each of the field effect transistor (FET) switches.

The output to each FET switch is through an emitter-follower circuit that is completely cut off when its preceding saturated inverter is in a low state. The cut off follower insures that the FET gate sees exactly zero volts, not the transistor saturation voltage, and therefore has minimum on-resistance for low level signals to be commutated.

The Y readout logic is similar to the X readout logic but it operates at a clock rate of only 3 kilocycles. Because of its similarity to the X readout logic, it is not considered necessary to show a circuit diagram of the Y readout logic.

As described so far, the camera operates in a mode dependent upon the steady phototransistor model and provides the ability to image scenes over a wide range of high light level conditions. The empirical discovery that the imaging system thus described exhibits an integration mode of operation, not predictable from steady-state analysis of the mosaic's phototransistor behavior, results in sensitivity increases which permit operation at much lower light levels. To most efficiently utilize this phenomenon, some modifications to the basic system just described are necessary.

The integration mode where outputs are now proportional to total light incident on the element during the frame time, represents an orders-of magnitude increase in sensitivity but, by nature of the read-out mechanization, contributes a nonuniformity to the response over each line (collector row).

An equivalent circuit model that explains the integration effect is one in which the additional output (above the steady state phototransistor response) represents charging current necessary to recharge the individual collector-base junction capacitances to the bias voltage when that collector strip is first pulsed. The amount of charging current depends on the voltage decay due to light-modulated leakage current across this junction during the off period (frame time minus line time) when the junction is reverse-biased. Since the output enhancing transient (recharge current) begins at the start of the collector row selection pulse and is characterized by an exponential decay, those elements sampled first carry the full enhanced output and those sampled near the end of that line have much less of the additional integration response—hence the image nonuniformity.

Several mechanizations have been evaluated for minimizing the nonuniformity. The first of these is removing the truncation logic from the horizontal 6-bit counter so that the first 14 of its (now 64) states are unrecognized by the decoding matrix and thus serve as a dead time or wait-period at the beginning of each line readout. The collector row pulse is applied at the beginning of this period, so by the time emitter sampling begins, the transient output of each element is in the less-rapidly changing portion of its decay, and uniformity from one end of the line to the other is better. Element sample times must again be shortened to keep the same frame rates.

The addition of a series impedance in each collector row drive line has the effect of increasing the rise time of the element transient response and decreasing its peak amplitude, thus adding uniformity by flattening out the response in time. This impedance in effect works with the collector-substrate capacitance to roll off the collector voltage waveform's leading edge. This technique of adding series collector impedance tends to introduce some frame-to-frame holdover since the limited recharge path cannot return each collector-base junction to the supply potential during a single line time. A method for achieving this, and therefore "zeroing the integrator" each frame, consists of switching the collector voltage of all *n* emitter follower readout amplifiers to ground for a short period at the end of each line time. This technique utilizes the collector-base junction of each emitter-follower transistor as a very low impedance, short time constant charge path for its mosaic element, but does not interfere with the normal readout sampling procedure.

An additional alternate compensation technique is an extra series impedance between each emitter column and its emitter follower amplifier. This increases the time constant of the transient's exponential decay, thus flattening the response but inherently adds some attenuation in the signal path. Success at improving imaging uniformity with different combinations of these two techniques depends upon the individual mosaic characteristics. Variations of as little as 2:1 over the entire image line have been achieved at 60 Hz. frame rates for mosaics with uncompensated variations of several orders of magnitude.

Element readout (horizontal scanner) on a return-to-zero (RZ) basis yields a video waveform that is easier to process while preserving low frequency information. This RZ sampling is easily mechanized by adding an extra input to the horizontal address decoding logic. This input is provided by running the internal clock at twice its original frequency and dividing by two to feed the 6-bit counter. One side of the "divide-by-two" flip flop gives the extra gating signal that enables the commutator switches only during the second half of the basic sampling interval. In addition to giving a more versatile video waveform, this type of commutator drive prevents the selection of additional unwanted channels by false states that occur during the transitions of the ripple counter.

The RZ video format allows interpulse blanking to be applied along with the line and frame retrace blanking described earlier. The mechanization involves an adjustable intensification pulse, or pedestal upon which the video sample is superimposed, during the unblanked periods. The video output during the remaining time in each element sample period is at a level less than that which corresponds to minimum scene brightness (dark current of the sensor mosaic). This variable blacker-than-black minimum video level just described, plus a video amplifier gain control, provide wide latitude in the composite video signal output to match the optimum portion of a display system's transfer characteristic for a variety of imaged scenes and viewing conditions.

SEQUENCE OF OPERATION

A basic description of the functioning of the television camera system of FIGURE 3 through one cycle of operation is as follows: A clock generator 16 drives horizontal address selection logic consisting of a counter 18, buffer drivers 20 and horizontal address decoding matrix 22 which controls a fifty (N) position commutator 28 (consisting of FET switches), through drive lines 24 and switch pulse amplifiers 26. The function of this commutator is to sequentially connect each of the fifty (N) emitter follower readout amplifiers 30 to the system's output video amplifier 32.

The output of the video amplifier 32 drives a video blank mixer 34 which adds suitable signal blanking pulses drawn from the horizontal sweep generators 36 and the vertical sweep generators 38, to generate the RZ video format described above. The output of the video blank mixer drives the Z axis of a cathode ray picture tube 40, whose horizontal and vertical sweeps are derived from the horizontal sweep generator circuit 36 and the vertical sweep generator circuit 38 respectively. The emitter followers 30 provide amplification of the sensor photocurrents from the mosaic emitter connections 42 prior to switching and present a more workable source impedance to the commutator 28. At the end of each cycle of the horizontal commutator, a similar vertical address selection system consisting of counter 44, buffer drivers 46, and vertical address decoding matrix 48 is advanced by one position so that a different one of the mosaic's fifty collector connections 50 is biased on by its pulse driver 52 for the duration of the following horizontal scan through the fifty (N) emitter columns 42. In this manner the entire mosaic 54 is interrogated, thus generating one video frame or complete sample of the image in the mosaic's field of view. Suitable logic signals are taken from the addressing logic 48 and 22 to trigger vertical sweep generator 38 and horizontal sweep generator 36 for beam deflection in an image monitor 40 and to provide proper video blanking for line and frame retrace periods.

The horizontal counter 18 must be clocked at a speed equal to the frame rate times M lines per frame times N elements per line or $60 \times 50 \times 50 = 150$ kHz. which is, therefore, the reciprocal of the individual element sample time. The vertical counter 44 is advanced at a rate of one Mth of this, or 3 kHz. Suitable trigger pulses are taken from both address decoding matrices 48 and 22 to start the vertical sweep generator 38 and the horizontal sweep generator 36 for the system's image monitor 40. Actual clock rates are somewhat faster to allow an additional element sample period for horizontal fly back time and an additional line-time for frame fly back.

A significant feature of this solid state image converter is freedom to vary frame rates, line scan times, or to even depart from the conventional raster-type scan, since the digital addressing of the mosaic can be done at frequencies down to DC and in random order, not limited by the deflection rates of a conventional camera's electron beam. Total frame time has been reduced by the elimination of all return time, both horizontally and vertically. A variable resolution system has been envisioned for video data compression, whereby only every $r$th element in the matrix grid is read out, until more detail is required and every element is then scanned. Scrambling of the video data for secure transmission is achieved in real time by merely driving the camera system's address decoding logic from pseudo random code generators.

Another distinctive feature of this camera system is its potential for operation over an extremely wide variation of scene intensity levels. Its basic phototransistor mode of operation, characterized by an equivalent photo-current generator, has very wide dynamic range at relatively high light levels. In its integration mode (with light-modulated charge leakage model) a smaller dynamic range is realized at much lower light levels. Important here is the inherent nature of the phototransistor sensor structure which exhibits no lingering effects of exposure to saturating levels of incident light. Therefore there is no long term loss of useful sensitivity and "blooming" or expansion of bright image points is limited to the effects of crosstalk within the sensor mosaic.

It is not considered necessary in this patent disclosure to furnish all the details of the sub-circuits which go to make up the read-out circuit as shown in the block diagram of FIGURE 3. These individual sub-circuits are considered to be known per se to those skilled in the electronics arts and are therefore not per se considered to be a part of this invention.

The foregoing discussion of a camera system based on a M x N matrix sensor describes the implementation of a 2500 element ($50 \times 50$) imaging system. The general system mechanization for the class of M x N element imaging mosaic is disclosed here. Other cameras have been constructed and operated, notably 5 x 5 and 10 x 10, and mosaics having matrix dimensions of 100 x 128 are now in fabrication. Geometries other than rectangular have been considered; a polar coordinate configuration is a distinct possibility.

Obviously, numerous modifications and variations of the present invention are possible in the light of the above teachings. It is therefore to be understood that within the scope of the appended claims, the invention may be practiced otherwise than is specifically described.

What is claimed is:

1. A solid state television camera system comprising:

(a) lens means, (b) a mosaic sensor optically coupled to said lens means, said mosaic sensor having a plurality of rows of semiconductors, said semiconductor mosaic determining an image plane, said plane being oriented so as to be substantially normal to the path of the light rays sensed from said lens means, (c) a readout circuit connected to said sensor for sequentially reading the output of each of said semiconductors, and (d) an output circuit connected to said readout circuit for reading the output of said sensor.

2. The solid state television camera system of claim 1 in which said semiconductors are transistors.

3. The solid state television camera system of claim 1 in which:

(a) said mosaic sensor includes a wafer and a plurality of rows of phototransistors fabricated in said wafer, and (b) said readout circuit is a molecular digital system having a timing and switching circuit connected to said mosaic sensor.

4. The solid state television camera system of claim 3 in which said phototransistors are of the n-p-n type.

5. The solid state television camera system of claim 3 in which said phototransistors are of the p-n-p type.

6. The soild state television camera system of claim 1 wherein said mosaic sensor comprises:

(a) a monolithic wafer, (b) a plurality of rows of phototransistors fabricated in said wafer, (c) each said row of phototransistors comprising (1) a semiconductor strip disposed on said wafer, said strip being a common collector row, (2) a plurality of discrete base and emitter regions, disposed adjacent to each said collector row, (d) the portions of said wafer lying between said strips being effective as isolation areas to electrically insulate adjacent ones of said collector rows, (e) a plurality of strips for electrically connecting a plurality of said discrete emitter regions to form emitter rows, said emitter rows running perpendicular to said collector rows, (f) whereby any combination of one of said emitter rows and one of said collector rows will provide unique access to one of said phototransistor elements.

7. The solid state television camera system of claim 6 including:

(a) a terminal strip board, said wafer being mounted on said board, (b) a plurality of terminal strips mounted on said board around said wafer, each said terminal strip being connected to a different one of said emitter rows and said collector rows.

8. The camera system of claim 7 wherein the said readout circuit comprises:

(a) a timing circuit, (b) a plurality of collector voltage pulse amplifiers operatively connected to said timing circuit, each said collector voltage pulse amplifier being connected sequentially to a corresponding one of said collector rows by said timing circuit, (c) emitter commutating switches connected to said timing circuit, said switches being effective to sequentially commutate the said emitter elements in a said collector row while voltage is being applied to said collector row, (d) an emitter follower stage connected between each of said emitter rows of said mosaic sensor and the corresponding one of said emitter commutating switches, and (e) an output circuit connected to said emitter commutating switches for visually displaying the output of said mosaic sensor.

9. The camera system of claim 8 in which the said timing circuit comprises:

(a) a clock generator, (b) a counter operatively connected to the said clock generator, (c) buffer drivers connected to said counter, (d) a horizontal address decoding matrix connected to said counter through said buffer drivers, said matrix being effective to operate said emitter commutating switches, (e) a second counter connected to and operated by said horizontal address decoding matrix, (f) second buffer drivers connected to said second counter, and (g) a vertical address decoding matrix operatively connected to said second counter through said second buffer drivers, said vertical address decoding matrix being effective to operate said collector voltage pulse amplifiers.

10. The camera system of claim 9 wherein said output circuit comprises:

(a) a cathode ray tube for visual display of the output of said mosaic sensor, (b) a horizontal sweep generator connected between said horizontal address decoding matrix and said cathode ray tube, (c) a vertical sweep generator connected between said vertical address decoding matrix and said cathode ray tube, (d) a video amplifier connected to said emitter commutating switches, and (e) a video blank mixer connected between said video amplifier and said vertical address decoding matrix and connected to said cathode ray tube.

11. The camera system of claim 10 including a series impedance operatively connected to each one of said collector rows, said impedances being effective to create more uniform output from the individual phototransistors in each collector row.

12. The camera system of claim 11 including a second series impedance connected between each said emitter follower stage and its corresponding said emitter row, said second series impedances being effective to create more uniform output from the individual phototransistors in each collector row.

13. The camera system of claim 8 including a series impedance connected between each said emitter follower stage and its corresponding said emitter row, said series impedances being effective to create more uniform output from the individual phototransistors in each collector row.

14. The camera system of claim 13 wherein the said output circuit includes:

(a) a cathode ray tube for visual display of the output of said mosaic sensor, (b) a horizontal sweep generator connected between said horizontal address decoding matrix and said cathode ray tube, (c) a vertical sweep generator connected between said vertical address decoding matrix and said cathode ray tube, (d) a video blank mixer connected between said video amplifier and said vertical address decoding matrix and connected to said cathode ray tube.

15. The solid state television camera system of claim 12 in which said phototransistors are of the n-p-n type.

16. The solid state television camera system of claim 12 in which said phototransistors are of the p-n-p type.

References Cited

UNITED STATES PATENTS

| | | | |
|---|---|---|---|
| 3,111,556 | 11/1963 | Knoll et al. | 178—7.1 |
| 3,083,262 | 3/1963 | Hanlet | 178—7.5 |
| 3,290,753 | 12/1966 | Chang | 307—213 |
| 3,343,002 | 9/1967 | Ragland | 178—7.6 |

RICHARD MURRAY, Primary Examiner

A. H. EDDLEMAN, Assistant Examiner